US011386587B2

(12) United States Patent
Matsumoto (10) Patent No.: US 11,386,587 B2
(45) Date of Patent: Jul. 12, 2022

(54) AUTOMATIC COLORING OF LINE DRAWING

(71) Applicant: Preferred Networks, Inc., Tokyo (JP)

(72) Inventor: Eiichi Matsumoto, Tokyo (JP)

(73) Assignee: PREFERRED NETWORKS, INC., Tokyo (JP)

( * ) Notice: Subject to any disclaimer, the term of this patent is extended or adjusted under 35 U.S.C. 154(b) by 0 days.

(21) Appl. No.: 16/135,627

(22) Filed: Sep. 19, 2018

(65) Prior Publication Data

US 2019/0087982 A1 Mar. 21, 2019

(30) Foreign Application Priority Data

Sep. 20, 2017 (JP) .............................. JP2017-180427

(51) Int. Cl.
G06T 11/00 (2006.01)
G06T 7/13 (2017.01)
G06T 11/20 (2006.01)
G06N 20/00 (2019.01)

(52) U.S. Cl.
CPC ............ *G06T 11/001* (2013.01); *G06N 20/00* (2019.01); *G06T 7/13* (2017.01); *G06T 11/203* (2013.01); *G06T 2207/20081* (2013.01)

(58) Field of Classification Search
CPC ....... G06T 11/001; G06T 11/203; G06T 7/13; G06T 2207/20081; G06N 20/00; G06N 3/08
USPC .......................................................... 345/593
See application file for complete search history.

(56) References Cited

U.S. PATENT DOCUMENTS

| 2012/0026184 | A1 | 2/2012 | Kashio et al. |
| 2018/0082407 | A1* | 3/2018 | Rymkowski ............ G06T 11/60 |
| 2018/0150947 | A1* | 5/2018 | Lu ............................ G06N 3/08 |
| 2018/0285679 | A1 | 10/2018 | Amitay |
| 2019/0058489 | A1 | 2/2019 | Matsuo et al. |
| 2019/0236813 | A1 | 8/2019 | Yonetsuji |
| 2020/0082249 | A1* | 3/2020 | Hua ...................... G06T 11/001 |

FOREIGN PATENT DOCUMENTS

| JP | H09-134422 A | 5/1997 |
| JP | 2004-334814 A | 11/2004 |

OTHER PUBLICATIONS

Iizuka et al., "Let there be Color!: Joint End-to-end Learning of Global and Local Image Priors for Automatic Image Colorization with Simultaneous Classification," AMC transactions on Graphics (SIGGRAPH 2016 issue), vol. 35, No. 4 (2016) Available on the Internet <URL: http://hi.cs.waseda.ac.jp/~iizuka/projects/colorization/ja/>.

(Continued)

*Primary Examiner* — King Y Poon
*Assistant Examiner* — Vincent Peren
(74) *Attorney, Agent, or Firm* — Foley & Lardner LLP (57) ABSTRACT

A line drawing automatic coloring method according to the present disclosure includes: acquiring line drawing data of a target to be colored; receiving at least one local style designation for applying a selected local style to at least one place of the acquired line drawing data; and performing coloring processing reflecting the local style designation on the line drawing data based on a learned model for coloring in which it is learned in advance using the line drawing data and the local style designation as inputs.

36 Claims, 5 Drawing Sheets

(56) References Cited

OTHER PUBLICATIONS

Jing et al., "Neural Style Transfer: A Review," arXiv: 1705.04058v6 [cs.CV] Available on the Internet <URL: http://arxiv.org/abs/1705.04058> (submitted May 11, 2017, last revised Jun. 17, 2018).
Preferred Networks, Inc., "PaintsChainer: line drawing automatic coloring service," (Jan. 27, 2017), Available on the Internet <URL: https://paintschainer.preferred.tech/>.
Qu et al., "Manga Colorization," AMC transactions on Graphics (SIGGRAPH 2006 issue), vol. 25, No. 3, (Jul. 2006) pp. 1214-1220. Available on the Internet <URL: http://www.cse.cuhk.edu.hk/~ttwong/papers/magna/magna.html>.
Sangkloy et al., "Scribbler: Controlling Deep Image Synthesis with Sketch and Color," arXiv:1612.00835v2 [cs.CV] (Dec. 5, 2016), Available on the Internet <URL: https://arxiv.org/pdf/1612.00835.pdf>.
Sangkloy et al., "Scribbler: Controlling Deep Image Synthesis with Sketch and Color," Computer Vision and Pattern Recognition, CVPR (2017), Available on the Internet <URL: http://scribbler.eye.gatech.edu/>.
Yonetsuji, "PaintsChainer," SlideShare, (Mar. 22, 2017), Available on the Internet <URL: https://www.slideshare.net/taizanyonetuji/chainer-meetup-73457448>.
Yonetsuji, "Using Chainerto colors ketches yields surprising results," Qiita (Dec. 25, 2016), Available on the Internet <URL:http://qiita.com/taizan/items/cf77fd37ec3a0bef5d9d>.
Zhang, "Colorful Image Colorization," SIGGRAPH 2016, <http://richzhang.github.io/colorization/>.
Zhang, "Real-Time User-Guided image Colorization with Learned Deep Priors," SIGGRAPH 2017, Available on the Internet <https://richzhang.github.io/ideepcolor/>.
Furusawa et al., "Automatic coloring of manga by convolution neural network using color features as input," DIEM Forum, 2017; http://dbevent.jpn.org/deim2017/papers/188.pdf.
Furusawa et al., "Comicolorization: Semi-Automatic Manga Colorization," arXiv, https://arxiv.org/pdf/1706.06759.pdf (Sep. 2017).
Furusawa, "Coloring Black-and-White Cartoons with Deep Learning—Using Reference Images," Dwango Media Village, 2017, https://dwango.github.io/articles/comicolorization/.
Hasegawa, Keisuke, "Artificial Intelligence by Adobe Sensei is amazing! Technical summary of 11," 2017, https://ksk-h.com/adobesensei/.
Illyasviel, Style2Paints, GitHub, https://github.com/Illyasviel/style2paints.
Shah et al., "Reference Constrained Cartoon Colorization," 2017; https://pdfs.semanticschoiar.org/84d3/dd8da36d8002f8d8d33d244d440035f85f17.pdf.

Office Action dated Mar. 27, 2020, in U.S. Appl. No. 16/261,117 (US 2019-0236813).
Office Action dated Jul. 23, 2020, in U.S. Appl. No. 16/261,117 (US 2019-0236813).
Furusawa et al., "Comicolorization: Semi-Automatic Manga Colorization", SIGGRAPH Asia 2017 Technical Briefs, 2017, pp. 1-4.
Gatys et al., "A Neural Algorithm of Artistic Style", arXiv Preprint arXiv: 1508.06576, 2015.
Hensman et al., "cGAN-Based Manga Colorization using a Single Training Image", 2017 14th IAPR International Conference on Document Analysis and Recognition (ICDAR), vol. 3, IEEE, 2017.
Ito et al., "Interactive Region Segmentation for Manga", 2016 23rd International Conference on Pattern Recognition (ICPR), IEEE, 2016.
Zhang et al., "Style Transfer for Anime Sketches with Enhanced Residual U-Net and Auxiliary Classifier Gan", 2017 4th IAPR Asian Conference on Pattern Recognition (ACPR), IEEE, 2017.
Office Action dated Apr. 30, 2021, in U.S. Appl. No. 16/261,117 (US 2019-0236813).
Advisory Action dated Feb. 22, 2021, in U.S. Appl. No. 16/261,117 (US 2019-0236813).
Office Action dated Dec. 11, 2020, in U.S. Appl. No. 16/261,117 (US 2019-0236813).
Notice of Allowance dated Aug. 20, 2021 in U.S. Appl. No. 16/261,117 (US 2019-0236813).
Wenqi Xian et al., "TextureGAN: Controlling Deep Image Synthesis with Texture Patches" (Version 1), pp. 1:2-1:10 (2017) Available online, URL: https://arxiv.org/pdf/1706.02823v1.pdf (Jun. 9, 2017).
Wenqi Xian et al., "TextureGAN: Controlling Deep Image Synthesis with Texture Patches" (Version 2), pp. 1-10 (2017) Available online, URL: https://arxiv.org/pdf/1706.02823v2.pdf (Dec. 23, 2017).
Kataoka et al., "Automatic Coloring of Manga Images Using Hostile Networks in Deep Learning", Information Processing IPSJ SIG Technical Report, vol. 2017-CVIM-206, No. 6, (2017), fifteen (15) pages.
U.S. Notice of Allowance dated Nov. 17, 2021, in U.S. Appl. No. 16/261,117.
Cheng et al., "Deep Colorization", 2015 IEEE International Conference on Computer Version (ICCV), pp. 415-423, Dec. 7-13, 2015.
Ishikawa, "Colorizing Black and White Images with Artificial Intelligence", Image Laboratory, vol. 28, No. 10, pp. 14-21, Oct. 10, 2017.
Nakajima, "Controlling Artificial Intelligence on PC" Impress Co. Ltd., pp. 132-136, Aug. 11, 2017.

* cited by examiner

AUTOMATIC COLORING OF LINE DRAWING

CROSS-REFERENCE TO RELATED APPLICATIONS

This application claims the benefit and priority to Japanese application number JP2017-108427 filed Sep. 20, 2017, the disclosure of which is incorporated in its entirety by reference herein.

BACKGROUND

Technical Field

The present disclosure relates to a line drawing automatic coloring program, a line drawing automatic coloring device, and a line drawing automatic coloring method for automatically coloring a line drawing image.

Related Art

In recent years, machine learning using a neural network having a multilayer structure, called deep learning has been applied in various fields. The machine learning has also been prominently utilized and has achieved a remarkable result in a field of image processing such as image recognition and image generation.

SUMMARY

A line drawing automatic coloring program according to the present disclosure is a line drawing automatic coloring program for causing a computer to realize processing for automatically performing coloring on line drawing data, the line drawing automatic coloring program causing the computer to realize the following functions: a line drawing data acquiring function of acquiring line drawing data of a target to be colored; a local style designation receiving function of receiving at least one local style designation for applying a selected local style to any place of the acquired line drawing data; and a coloring processing function of performing coloring processing reflecting the local style designation received by the local style designation receiving function on the line drawing data acquired by the line drawing data acquiring function based on a learned model for coloring in which it is learned in advance to perform coloring processing while reflecting the local style on the line drawing data using the line drawing data and the local style designation as inputs.

In addition, in the line drawing automatic coloring program according to the present disclosure, the local style designation receiving function includes: a reference image acquiring function of acquiring at least one reference image from which a user desires to extract the local style; a local style extraction place designating function of receiving at least one designation of a place from which the user desires to extract the local style in the acquired reference image; a local style extracting function of performing extraction processing of extracting the local style from the reference image with respect to at least one designated place designated by the local style extraction place designating function; and a local style application designating function of designating a place to which the local style extracted by the local style extracting function is applied with respect to the line drawing data acquired by the line drawing data acquiring function.

In addition, in the line drawing automatic coloring program according to the present disclosure, the local style designation receiving function is configured to receive at least one local style designation selected by a user from a plurality of local styles extracted in advance by extraction processing and stored by a storage means.

In addition, in the line drawing automatic coloring program according to the present disclosure, in the extraction processing for the local style, the local style is extracted based on a learned model for a local style in which it is learned in advance to extract the local style from any place of the reference image.

In addition, in the line drawing automatic coloring program according to the present disclosure, an encoder obtained by preparing plural sets of line drawing data and coloring correct answer image data and executing the following steps for the plural sets of line drawing data and coloring correct answer image data is set to the learned model for a local style, each set having line drawing data and coloring correct answer image data representing a correct answer coloring state for the line drawing data, and the following steps including: a step of inputting the coloring correct answer image data as the reference image to the encoder extracting the local style and generating a local style map corresponding to each of all pixels of the input coloring correct answer image data; a step of picking up at least one local style from the local style map extracted by the encoder and inputting the picked up local style together with the line drawing data to a decoder; a step of executing coloring processing reflecting the picked up local style on the line drawing data in the decoder to obtain colored image data; a step of calculating loss of the colored image data with respect to the coloring correct answer image data by a loss function, using the colored image data obtained by the decoder and the coloring correct answer image data; and a step of updating parameters of the encoder and the decoder so as to reduce the loss calculated by the loss function.

In addition, in the line drawing automatic coloring program according to the present disclosure, a decoder obtained by preparing plural sets of line drawing data and coloring correct answer image data and executing the following steps for the plural sets of line drawing data and coloring correct answer image data is set to the learned model for coloring, each set having line drawing data and coloring correct answer image data representing a correct answer coloring state for the line drawing data, and the following steps including: a step of inputting the coloring correct answer image data as the reference image to an encoder extracting the local style and generating a local style map corresponding to each of all pixels of the input coloring correct answer image data; a step of picking up at least one local style from the local style map extracted by the encoder and inputting the picked up local style together with the line drawing data to the decoder; a step of executing coloring processing reflecting the picked up local style on the line drawing data in the decoder to obtain colored image data; a step of calculating loss of the colored image data with respect to the coloring correct answer image data by a loss function, using the colored image data obtained by the decoder and the coloring correct answer image data; and a step of updating parameters of the encoder and the decoder so as to reduce the loss calculated by the loss function.

A line drawing automatic coloring device according to the present disclosure includes: a line drawing data acquiring unit configured to acquire line drawing data of a target to be colored; a local style designation receiving unit configured to receive at least one local style designation for applying a selected local style to any place of the acquired line drawing data; and a coloring processing unit configured to perform coloring processing reflecting the local style designation received by the local style designation receiving unit on the line drawing data acquired by the line drawing data acquiring unit based on a learned model for coloring in which it is learned in advance to perform coloring processing while reflecting the local style on the line drawing data using the line drawing data and the local style designation as inputs.

In addition, in the line drawing automatic coloring device according to the present disclosure, the local style designation receiving unit includes: a reference image acquiring unit configured to acquire at least one reference image from which a user desires to extract the local style; a local style extraction place designating unit configured to receive at least one designation of a place from which the user desires to extract the local style in the acquired reference image; a local style extracting unit configured to perform extraction processing of extracting the local style from the reference image with respect to at least one designated place designated by the local style extraction place designating unit; and a local style application designating unit configured to designate a place to which the local style extracted by the local style extracting unit is applied with respect to the line drawing data acquired by the line drawing data acquiring unit.

According to the present disclosure, a line drawing automatic coloring method for automatically performing coloring on line drawing data includes: a line drawing data acquiring step of acquiring line drawing data of a target to be colored; a local style designation receiving step of receiving at least one local style designation for applying a selected local style to any place of the acquired line drawing data; and a coloring processing step of performing coloring processing reflecting the local style designation received in the local style designation receiving step on the line drawing data acquired in the line drawing data acquiring step based on a learned model for coloring in which it is learned in advance to perform coloring processing while reflecting the local style on the line drawing data using the line drawing data and the local style designation as inputs.

In addition, in the line drawing automatic coloring method according to the present disclosure, the local style designation receiving step includes: a reference image acquiring step of acquiring at least one reference image from which a user desires to extract the local style; a local style extraction place designating step of receiving at least one designation of a place from which the user desires to extract the local style in the acquired reference image; a local style extracting step of performing extraction processing of extracting the local style from the reference image with respect to at least one designated place designated in the local style extraction place designating step; and a local style application designating step of designating a place to which the local style extracted in the local style extracting step is applied with respect to the line drawing data acquired in the line drawing data acquiring step.

BRIEF DESCRIPTION OF DRAWINGS

FIG. 5 is a block diagram showing a configuration of a line drawing automatic coloring device according to a second embodiment.

DETAILED DESCRIPTION

First Embodiment

Figure 1:
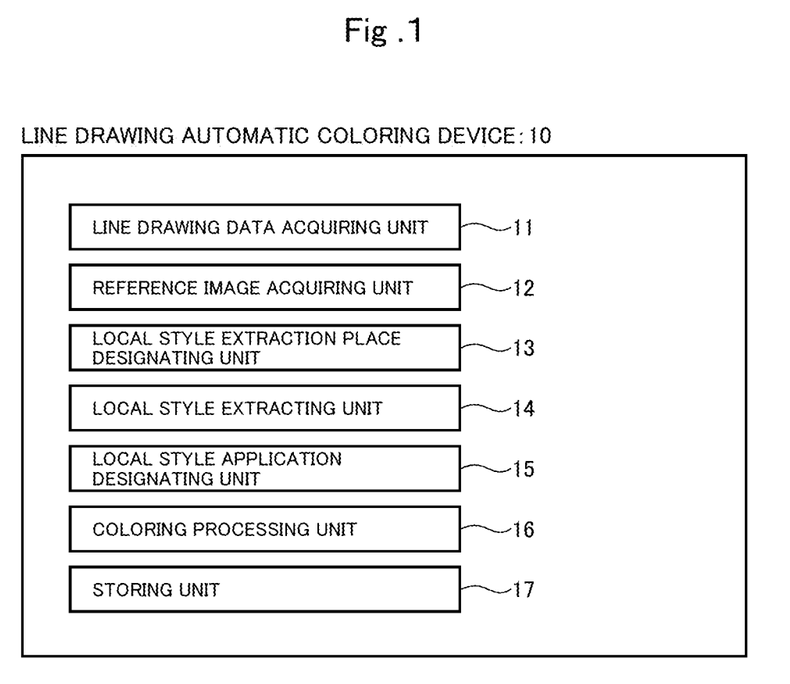
FIG. 1 is a block diagram showing a configuration of a line drawing automatic coloring device according to the present disclosure.

Hereinafter, an example of a line drawing automatic coloring device according to a first embodiment is described with reference to the drawings. FIG. 1 is a block diagram showing a configuration of a line drawing automatic coloring device 10 according to the present disclosure. It should be noted that the line drawing automatic coloring device 10 may be a device designed as a dedicated machine, but it is assumed that the line drawing automatic coloring device 10 is a device that can be realized by general computers. In this case, it may be assumed that the line drawing automatic coloring device 10 includes a central processing unit (CPU), a graphics processing unit (GPU), a memory, and a storage such as a hard disk drive that are normally included in the general computers and are not shown. In addition, various types of processing may be executed by a program in order to cause these general computers to function as the line drawing automatic coloring device 10 according to the present embodiment.

As shown in FIG. 1, the line drawing automatic coloring device 10 includes at least a line drawing data acquiring unit 11 (also referred to as line drawing data acquirer), a reference image acquiring unit 12 (also referred to as reference image acquirer), a local style extraction place designating unit 13 (also referred to as local style extraction place designator), a local style extracting unit 14 (also referred to as local style extractor), a local style application designating unit 15 (also referred to as local style application designator), a coloring processing unit 16 (also referred to as coloring processor), and a storing unit 17 (also referred to as storage device).

The line drawing data acquiring unit 11 has a function of acquiring line drawing data of a target to be colored. In the present disclosure, line drawing, which is the target to be colored, is not particularly limited, but in a learning process of a learning model to be described below, it is preferable to include line drawing data similar to line drawing that a user desires to set as the target to be colored in terms of a thickness of a line, a type of touch or the like in line drawing data prepared as a set together with coloring correct answer image data.

The reference image acquiring unit 12 has a function of acquiring reference image data for extracting a local style that the user desires to apply to the line drawing data of the target to be colored. Here, the local style is a local style related to coloring such as a color, a texture, a gradation, a painting style, a pattern, a highlight, and a shadow.

The local style extraction place designating unit 13 has a function of designating a place at which the user desires to extract the local style in the reference image data acquired by the reference image acquiring unit 12. The local style is generated using information of neighboring pixels present within a predetermined range with respect to one pixel of the reference image data, and when the reference image data is composed of the number of pixels of width W×height H, a local style is generated for each pixel, and plural types of styles such as a color, a texture, a gradation, a painting style, a pattern, a highlight, and a shadow are extracted for one pixel. Therefore, when the number of types of styles is set to C, W×H×C local styles can be generated from one reference image data.

The local style extracting unit 14 has a function of extracting the local style from the reference image data. Extraction processing of the local style is performed based on, for example, a learned model for a local style learned in advance using training data for convolutional neural networks (CNN). It is possible to appropriately set up to which range the neighboring data to use for extracting the local style for one pixel of the reference image data, and extraction may be performed by a plurality of patterns with respect to up to which range the neighboring pixels are used for extracting the local style. The extraction processing in the local style extracting unit 14 may be a method of performing extraction processing only on the place designated by the local style extraction place designating unit 13 or may be a method of performing extraction processing of local styles on all pixels of the reference image data.

The local style application designating unit 15 has a function of designating which the local style extracted from the place designated by the local style extraction place designating unit 13 is applied to which area in the line drawing data of the target to be colored. The local style for the line drawing data may be designated at one place or may be designated at a plurality of places. In addition, all of the C types of local styles extracted from one pixel designated by the local style extraction place designating unit 13 may be applied to the designated place of the line drawing data or a specific local style of the C types of local styles may be selected and be applied to the designated place of the line drawing data. Any local styles and any characters of any local styles selected by the user can be applied. For example, it can be applied that only the local style related to the texture of the local styles extracted from one pixel designated by the local style extraction place designating unit 13 without applying the local style related to the color of the local styles.

The coloring processing unit 16 has a function of performing coloring processing reflecting the local style designated for the line drawing data. The coloring processing is performed based on, for example, a learned model. An example of the learned model for coloring is in which it is learned in advance to perform coloring processing reflecting the local style on the line drawing data using the line drawing data and the designation of the application place of at least one local style for the line drawing data as inputs. Colored image data is obtained by performing the coloring processing by the coloring processing unit 16.

The storing unit 17 has a function of storing data required for various processing performed in the line drawing automatic coloring device 10 including the line drawing data acquiring unit 11, the reference image acquiring unit 12, the local style extraction place designating unit 13, the local style extracting unit 14, the local style application designating unit 15, the coloring processing unit 16 and the like, and data obtained as a result of the processing.

Figure 2:
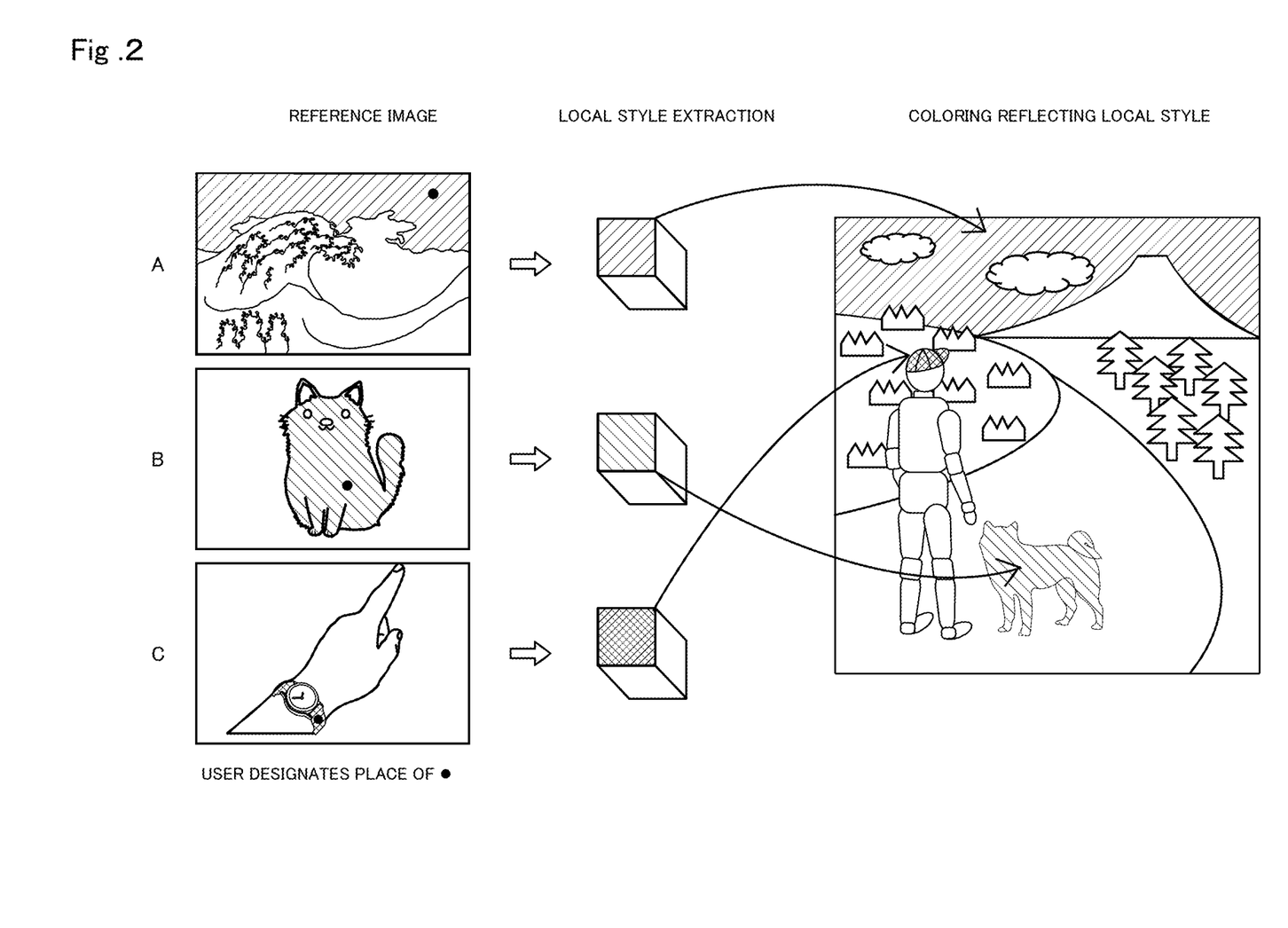
FIG. 2 is a view showing a concept of coloring processing using a local style in the line drawing automatic coloring device according to the present disclosure.

FIG. 2 is a view showing a concept of coloring processing using a local style in the line drawing automatic coloring device 10 according to the present disclosure. In the line drawing automatic coloring device 10 according to the present disclosure, when automatically coloring the line drawing data, it is possible to extract the local style desired by the user from a reference image and reflect the extracted local style on the line drawing data. Three reference images A, B, and C are shown on the left side of FIG. 2. When the user desires to use a portion of the sky of a background of the reference image A as a background of the line drawing data, the user designates one place of the background of the reference image A, extracts the local style from the designated point, and designates a place of the sky of the line drawing data as a point on which the user desires to reflect the local style extracted from the reference image A. In addition, when the user desires to use an expression of body hair of a cat of the reference image B for coloring of a dog of the line drawing data, the user designates one place of a body hair portion of the reference image B, extracts the local style from the designated point, and designates a body portion of the dog of the line drawing data as a point on which the user desires to reflect the local style extracted from the reference image B. When the user desires to use a texture of a belt of a wristwatch of the reference image C for coloring of a hat of the line drawing data, the user designates one place of a belt portion of the wristwatch of the reference image C, extracts the local style from the designated point, and designates a hat portion of the line drawing data as a point on which the user desires to reflect the local style extracted from the reference image C. As described above, using the local styles are extracted from each of the reference images A, B, and C, the places on the line drawing data on which the user desires to reflect the local styles are designated, and the coloring processing is performed on the places, colored image data shown on the right side of FIG. 2 by performing the coloring on the line drawing data is obtained. Hatching is performed to only the places at which the local styles are designated in the colored image data on the right side of FIG. 2, but although not expressed in FIG. 2, for example, the coloring processing may be also automatically performed on other places at which the local styles are not designated.

Figure 3:
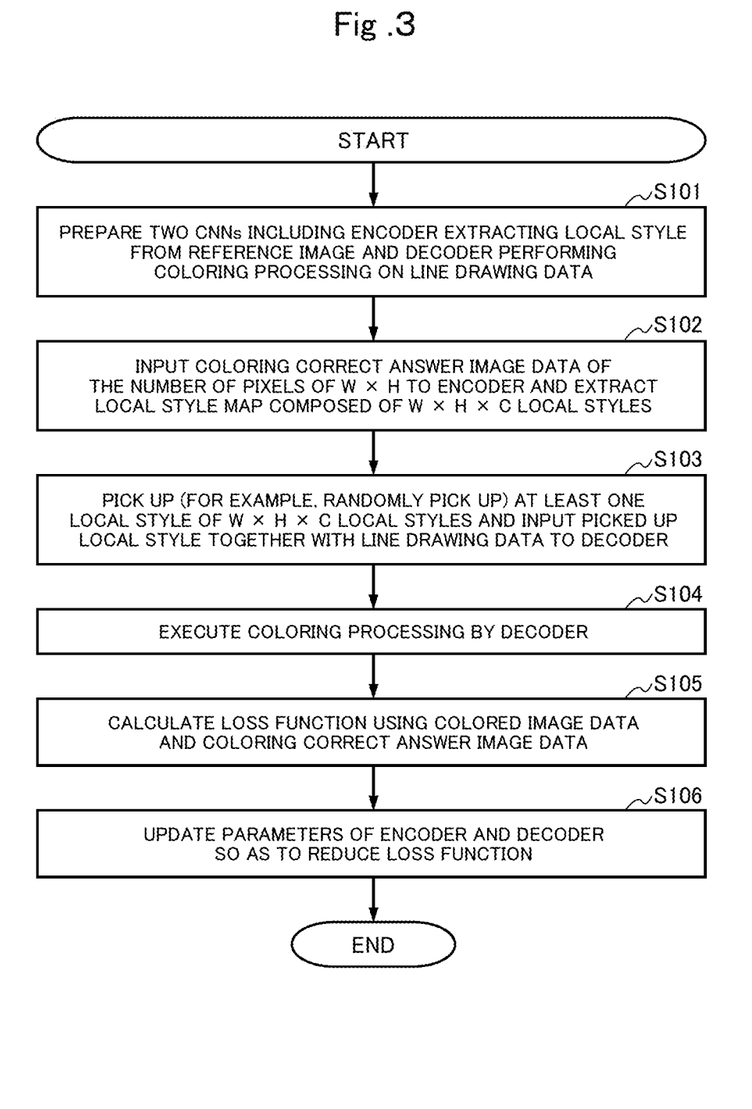
FIG. 3 is a flowchart showing a flow of learning of a learned model for a local style and a learned model for coloring that are used in the line drawing automatic coloring device according to the present disclosure.

FIG. 3 is a flowchart showing an example of flow of learning of a learned model for a local style and a learned model for coloring that are used in the line drawing automatic coloring device 10 according to the present disclosure. A learning method does not need to be one, and various learning processes can be used. For example, learning the learned model for a local style for extracting the local style and the learned model for coloring for performing the coloring processing can be simultaneously carried out.

For learning, plural sets of line drawing data and coloring correct answer image data are prepared, each set having line drawing data and coloring correct answer image data representing a correct answer coloring state for the line drawing data. A set of line drawing data and coloring correct answer image data can be prepared by extracting only the line drawing data from the coloring correct answer image data by edge extraction or the like.

In starting the learning processing, first, two convolutional neural networks including an encoder extracting a local style from a reference image and a decoder performing the coloring processing on the line drawing data are prepared as convolutional neural networks performing learning (S101).

Coloring correct answer image data of the number of pixels of W×H of the line drawing data and the coloring correct answer image data prepared as the sets are input as a reference image to the encoder, and the encoder extracts a local style map composed of W×H×C local styles (S102).

That is, the local style map corresponding to each of all the pixels of the input coloring correct answer image data is generated.

At least one local style of the W×H×C local styles extracted by the encoder is picked up (for example, randomly picked up), and the picked up local style is input together with the line drawing data to the decoder (S103). In this case, with respect to the designation of the application place of the local style for the line drawing data, an input is given so as to apply the local style to a pixel position on the line drawing data at the same position as a pixel position on the coloring correct answer image data at which the local style is picked up. In addition, a process of picking up the local style is to perform pick-up in both of a pattern that picks up all of the C types of local styles corresponding to one pixel as a bundle and a pattern that picks up only some of the C types of local styles corresponding to one pixel. With respect to a pick-up rule, in addition to random pickup, any process such as a process of performing pick-up according to a predetermined rule may be used. Learning including a pattern that does not pick up any local style may be performed. When considering convenience of the user, it is preferable that both of coloring that applies the local style and coloring that does not apply the local style can be performed.

The decoder executes coloring processing that reflects the picked up local style on the line drawing data (S104). The decoder executes the coloring processing to obtain colored image data.

Then, loss of the colored image data with respect to the coloring correct answer image data is calculated by a loss function, using the colored image data obtained by the decoder and the coloring correct answer image data (S105). Finally, parameters of the encoder and the decoder are updated so as to reduce the loss calculated by the loss function (S106). The updating process of the parameters of the encoder and the decoder may be repeated until the loss is reduced to be less than a threshold value.

Steps S101 to S106 of FIG. 3 indicate one cycle as a minimum unit of the learning. Learning of a considerable number of cycles can be repeated, and learning is completed in a step where appropriate extraction of the local style and acquisition of the colored image data in which appropriate coloring is performed become possible. Parameters and the like of the encoder at the completion of the learning are acquired as the learned model for a local style, parameters and the like of the decoder at the completion of the learning are acquired as the learned model for coloring, and the acquired parameters are in the storing unit 17.

Figure 4:
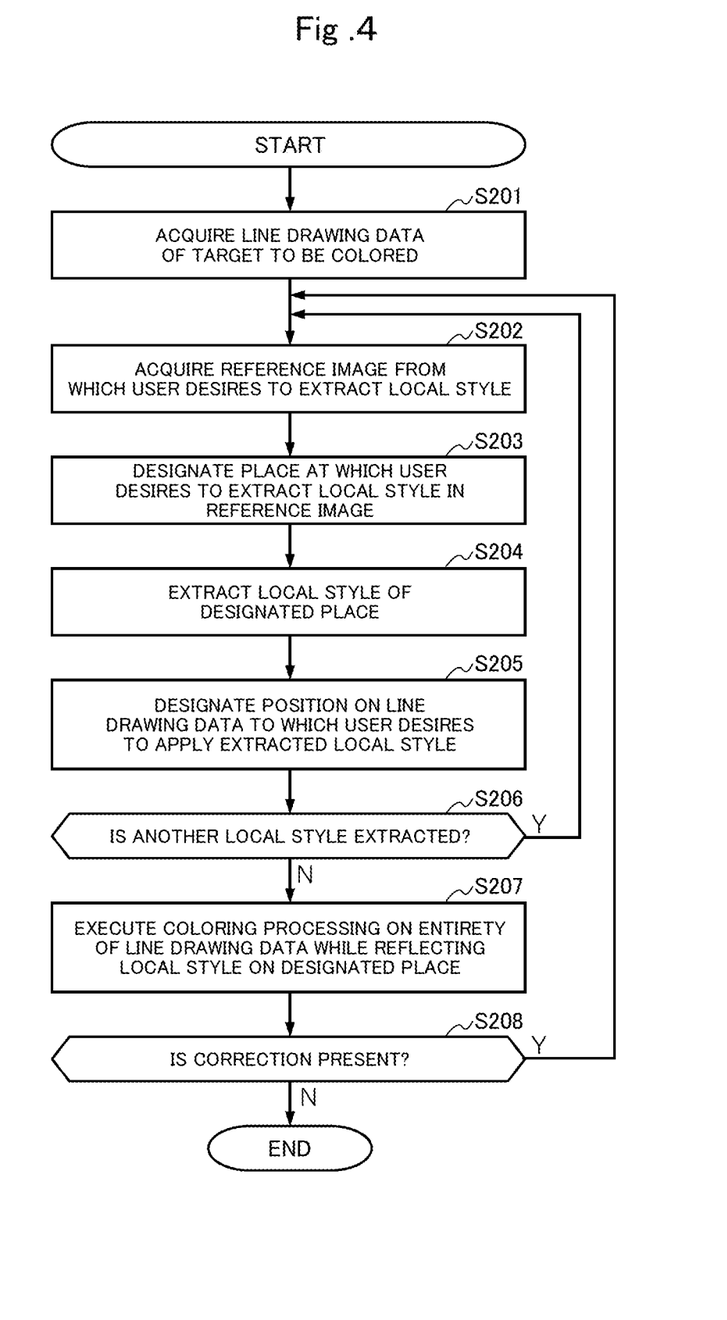
FIG. 4 is a flowchart showing a flow of coloring processing in the line drawing automatic coloring device according to the present disclosure.

FIG. 4 is a flowchart showing a flow of coloring processing in the line drawing automatic coloring device 10 according to the present disclosure. The coloring processing in the line drawing automatic coloring device 10 according to the present embodiment is started by acquiring the line drawing data (step S201). For example, the user selects the line drawing data of the target to be colored, such that the acquisition of the line drawing data is performed.

Then, the reference image data from which the user desires to extract the local style is acquired (step S202). In the acquired reference image data, the place at which the user desires to extract the local style is designated (step S203). Then, the local style of the designated place is extracted (step S204). The extraction of the local style is performed based on, for example, the learned model for a local style learned in advance using the training data. Next, a position on the line drawing data to which the user desires to apply the extracted local style is designated (step S205).

The above steps S201 to S205 can be executed based on a graphical user interface. For example, it is conceivable to display the acquired line drawing data and the acquired reference image data on respective display regions provided in a display screen, designate the extraction place of the local style by selecting a displayed reference image by, for example, a pointer of a mouse, and designate the application place of the local style by the pointer of the mouse for the displayed line drawing.

After executing steps S201 to S205, an input of the user for whether or not to extract and apply another local style is received, and it is determined whether or not to extract and apply another local style (step S206). When it is desired to extract and apply another local style (S206-Y), steps S201 to S205 are executed once again. The step can be repeated. When there is no need to extract another local style (S206-N), the coloring processing proceeds to the next step S207.

The coloring processing is executed on the entirety of the line drawing data while reflecting the local style on the designated place using the line drawing data, the local style, and the designation of the application place of the local style as inputs (step S207). The coloring processing is performed based on the learned model for coloring in which it is learned in advance to perform the coloring processing reflecting the local style on the line drawing data. The colored image data obtained by the coloring processing can be provided as, for example, a graphical user interface that causes the user to show a coloring state by displaying the colored image data instead of the line drawing data on a display region displaying the line drawing data on the display screen. An input of the user for whether or not the colored image data needs to be corrected is received, and it is determined whether or not the colored image data needs to be corrected (step S208). When the user desires to modify the colored image data (S208-Y), steps S201 to S205 are executed once again. In this case, steps S201 to S205 can be executed again in a state in which the extracted local style and the designation of the application place of the local style are maintained. When the colored image data does not need to be modified, (S208-N), the coloring processing ends.

As described above, according to the line drawing automatic coloring device 10 according to the present embodiment, with respect to the line drawing data of the target to be colored, the local style desired by the user is extracted from the reference image data, the place to which the extracted local style is applied is designated in the line drawing data, and the coloring processing can be executed. Therefore, it can realize automatic coloring processing reflecting the local styles related to the coloring characters such as the texture, the gradation, the painting style, the pattern, the highlight, and the shadow as well as the color at the place desired by the user in the line drawing data. In addition, when designating the local style, plural types of local styles simultaneously extracted for the same pixel can be designated as a bundle and only some local styles of plural types of local styles simultaneously extracted for the same pixel can be selected and designated. Therefore, for example, a local style in which the user desires to reflect only the texture without reflecting the color can be designated, such that the user experience is improved.

In some embodiments, the place to which the local style desired by the user is applied is designated with respect to the line drawing data of the target to be colored, and the coloring processing can be executed. In other words, it is possible to realize the automatic coloring processing reflecting the local styles related to the coloring such as the texture, the gradation, the painting style, the pattern, the highlight, and/or the shadow as well as the color at the place desired by the user in the line drawing data. The local style may be extracted from the place designated by the user in the reference image in a state in which the reference image is acquired and be reflected on the line drawing data, or may be selected from the library by the user in a state in which a plurality of local styles are extracted in advance and are stored in the storing unit as the library and be reflected on the line drawing data. In addition, in the local style, plural types of local styles simultaneously extracted for the same pixel can be designated as a bundle or only some local styles of plural types of local styles simultaneously extracted for the same pixel can be selected and designated. Therefore, for example, a local style in which the user desires to reflect only the texture without reflecting the color can be designated, such that the user experience is improved.

Second Embodiment

A case in which the user selects the reference image data from which the user desires to extract the local style and extracts the local style from the reference image data has been described in the first embodiment, but the present disclosure is not limited thereto. In a second embodiment, an embodiment in which plural types of local styles are extracted in advance by extraction processing and are stored in a storage means and a user selects and uses a local style that the user desires to use among the plural types of local styles is described.

FIG. 5 is a block diagram showing a configuration of a line drawing automatic coloring device 20 according to a second embodiment. As shown in FIG. 5, the line drawing automatic coloring device 20 includes at least a line drawing data acquiring unit 11, a local style designation receiving unit 21, a coloring processing unit 16, and a storing unit 22. It is to be noted that components denoted by the same reference numerals as those of FIG. 1 according to the first embodiment perform the same functions as those of FIG. 1 in the present embodiment, and a description thereof is thus be omitted.

The local style designation receiving unit 21 has a function of receiving at least one local style designation for applying a selected local style to any place of acquired line drawing data. The local style designation according to the present embodiment is performed in a form in which the user selects a desired local style from a local style library in which the plural types of local styles are extracted in advance and stored and designates a place on the line drawing data on which the user desires to reflect the selected local style.

It is noted that the local style designation receiving unit 21 in the present embodiment may have the same function as the function of extracting the local style from the reference image data and reflecting the extracted local style on the line drawing data, which is performed in the reference image acquiring unit 12, the local style extraction place designating unit 13, the local style extracting unit 14, and the local style application designating unit 15 in the first embodiment. That is, the local style designation receiving unit 21 may have both functions so that the local style may be extracted and used from the reference image data or may be selected and used from the local style library.

The storing unit 22 similarly stores data stored in the storing unit 17 in the first embodiment and required for various processing and data obtained as a result of the processing, and also stores the local style library constituted by the plural types of local styles extracted in advance. It is preferable that the local style libraries can be classified and sorted depending on desired conditions such as a type of texture, author and the like so as to be easily used by the user.

A flow of coloring processing in the line drawing automatic coloring device 20 according to the second embodiment is the same as of the coloring processing in FIG. 4 except that processing in which the user selects the desired local style with reference to the local style library stored in the storing unit 22 and designates a position on the line drawing data on which the user desires to reflect the selected local style is executed instead of the processing of extracting and applying the local style from the reference image data in steps S202 to S205 in FIG. 4 with respect to the coloring processing of the line drawing automatic coloring device 10 according to the first embodiment.

As described above, according to the line drawing automatic coloring device 20 according to the second embodiment, the place to which the local data desired by the user is applied is designated with respect to line drawing data of a target to be colored with reference to the local style library, and the coloring processing can be executed. Therefore, it is possible to realize automatic coloring processing reflecting local styles related to coloring such as a texture, a gradation, a painting style, a pattern, a highlight, and a shadow as well as a color at the place desired by the user in the line drawing data. Since the local style library is created in advance and the user can select the local style from the local style library, a frequently used local style can be used for the coloring processing without being extracted from the reference image data each time, such that convenience of the user is improved.

A case in which the coloring processing is executed after the designation of all the local styles ends when the designation of the local styles for the line drawing data is performed plural times has been described in the first and second embodiments, but the present disclosure is not limited thereto. For example, the coloring processing may be frequently executed each time the designation of the application place of the local style from the reference image data or the designation of the application place of the local styled from the local style library is performed on the line drawing data. As described above, by executing the coloring processing each time and displaying the colored image data on the display region of the display screen each time, the user can designate an application place of the next local style while confirming a state of a colored image changed each time the application place of the local style is designated, such that the user experience is improved.

The coloring processing that applies the local style has been described in the first and second embodiments, but there are many local styles having directionality or regularity such as a gradation or a pattern. When applying these local styles to the designated place of the line drawing data, a function of performing conversion processing such as converting angles of the local styles, converting hues of the local styles, or changing orientations of gradations of the local styles may be added. As a result, the user experience is further improved.

In the first and second embodiments, after the extraction place of the local style is designated, the place to which the extracted local style is applied is determined by designating any place from the line drawing data displayed on the display screen by the user, who provides the instruction via a user interface. In this case, a function of informing the user of the place on the line drawing data related to the place at which the local style is extracted may be provided.

Processing using an existing image recognition technique, such as pattern matching or object detection is performed on each of the reference image data and the line drawing data to extract with which place on the line drawing data a feature of an image of the extraction place of the local style has a high relationship. For example, when the user selects an "eye" portion of a person on the reference image data by clicking the mouse, a place corresponding to a feature of an "eye" is extracted from the line drawing data using an existing image recognition technique and is presented in a form in which it can be recognized by the user. For example, a method of informing the user of the correspondence by blinking an "eye" portion on the line drawing data displayed on the display screen or temporarily changing a color of the "eye" portion is conceivable.

Likewise, when a specific place on the line drawing data previously displayed on the display screen is selected by a click or the like by the mouse, candidate places of a local style that are to be applied to the selected place may be extracted by performing processing using an image recognition technique.

In addition, the candidate places are not only extracted by performing the processing using the image recognition technique, but coloring processing reflecting the local style may also be automatically executed by automatically performing selection among the extracted candidate places.

Further, when a plurality of targets on which the user desires to perform the same coloring processing appear, for example, when the same character repeatedly appears in a plurality of frames in comics or when the same character appears in a plurality of line drawing data of a target to be colored, the extracted local style may be simultaneously applied to these targets. Also in this case, candidate places of the target to be colored, having the same feature as that of the place designated so as to extract the local style are extracted by the existing image recognition technique, and the extracted local style is applied to a plurality of extracted candidate places. The processing as described above is performed, such that it is possible to efficiently perform animation creation, coloring processing of comics, and the like.

As described above, the application candidate places of the local style in the image data are extracted from the feature of the selected place in the reference image data using the image recognition technique, or the extraction place candidates of the local style in the reference image data are extracted from the feature of the selected place in the image data using the image recognition technique, such that there is an effect that the convenience of the user is improved.

A configuration in which the coloring processing applying the local style extracted from the reference image data is performed on the line drawing data has been described in the first and second embodiments, but the present disclosure is not limited thereto. The coloring processing according to the present disclosure may be applied to, for example, image data having the same property as that of the line drawing data such as black-and-white comics, a gray scale image, a pencil sketch, a line drawing in which a shadow, a halftone or the like is partially written, and an undercoated line drawing, in addition to the line drawing data, as long as the image data can be prepared in a pair with the coloring correct answer image data and learning can be performed based on the image data.

In the case of the line drawing data, the line drawing data that becomes a set by performing edge extraction processing on the coloring correct answer image data is extracted, but it is also possible to automatically create a pair before and after the coloring from a data set including only the coloring correct answer image data by using a standard image processing technique such as grayscale processing, processing converting a brightness into a halftone, or processing reducing the number of colors instead of the edge extraction processing.

What is claimed is:

1. A method of automatic coloring, comprising:
   acquiring data of a target to be colored;
   receiving at least one local style designation for applying a selected local style to at least a first part of the target to be colored, wherein the selected local style is not applied to another part of the target to be colored; and
   performing coloring processing reflecting the local style designation on the first part of the target to be colored, by inputting (i) the acquired data of the target to be colored, (ii) extracted information indicating the selected local style applied to the first part of the target, the extracted information being obtained from a predetermined process for extracting a local style based on a user-designated part of a reference image having the selected local style, and (iii) information indicating a position of the first part to which the selected local style is applied, into a neural network system for coloring the target to be colored,
   wherein the selected local style is related to a style different from a color, and
   wherein the neural network system is obtained based on at least a training process using at least (i) image data to be colored, (ii) extracted information that indicates a local style to be applied to a part of the image data to be colored and is obtained from the predetermined process for extracting a local style, (iii) information indicating a position of the part of the image data to be colored, and (iv) answer image data of the image data to be colored.

2. The method according to claim 1, wherein the receiving at least one local style designation includes:
   acquiring the reference image;
   receiving at least one designated place in the acquired reference image;
   performing, in the predetermined process for extracting the local style, extraction processing of extracting the extracted information indicating the selected local style from the reference image with respect to the at least one designated place; and
   designating a place to which the local style extracted is applied with respect to the data.

3. The method according to claim 2, wherein the neural network system extracts the selected local style from the at least one designated place in the reference image.

4. The method according to claim 1, wherein the at least one local style designation is a first local style of a plurality of local styles extracted in advance and stored by a storage device.

5. The method according to claim 1, further comprising:
   obtaining and updating an encoder by preparing plural sets of data and coloring correct answer image data and executing a plurality of steps for the plural sets of data and coloring correct answer image data, wherein the encoder is set related to a neural network for extracting a local style, and each set includes data and coloring correct answer image data representing a correct answer coloring state for the data, and wherein the plurality of steps include:

a step of inputting the coloring correct answer image data as a reference image to the encoder extracting a local style and generating a local style map corresponding to each of all pixels of the input coloring correct answer image data;

a step of selecting at least one local style from the local style map extracted by the encoder and inputting the selected local style together with the data to a decoder;

a step of executing coloring processing reflecting the selected and input local style on the data in the decoder to obtain colored image data;

a step of calculating loss of the colored image data with respect to the coloring correct answer image data by a loss function, using the colored image data obtained by the decoder and the coloring correct answer image data; and a step of updating parameters of the encoder and the decoder so as to reduce the loss calculated by the loss function.

6. The method according to claim 1, further comprising:
obtaining and updating a decoder by preparing plural sets of data and coloring correct answer image data and executing a plurality of steps for the plural sets of data and coloring correct answer image data, wherein the decoder is set related to a neural network for coloring, and each set includes data and coloring correct answer image data representing a correct answer coloring state for the data, and wherein the plurality of steps include:

a step of inputting the coloring correct answer image data as a reference image to an encoder extracting a local style and generating a local style map corresponding to each of all pixels of the input coloring correct answer image data;

a step of selecting at least one local style from the local style map extracted by the encoder and inputting the selected local style together with the data to the decoder;

a step of executing coloring processing reflecting the selected and input local style on the data in the decoder to obtain colored image data;

a step of calculating loss of the colored image data with respect to the coloring correct answer image data by a loss function, using the colored image data obtained by the decoder and the coloring correct answer image data; and a step of updating parameters of the encoder and the decoder so as to reduce the loss calculated by the loss function.

7. The method according to claim 1, wherein the data of the target to be colored include line drawing data.

8. The method according to claim 1, wherein the style different from a color is at least one of texture, gradation, painting style, pattern, highlight or shadow.

9. The method according to claim 1, wherein the local style designation includes the information indicating the selected local style and the information indicating the first part to which the selected local style is applied.

10. The method according to claim 1, wherein the selected local style is further related to a color.

11. The method according to claim 1, wherein the receiving the at least one local style designation includes receiving a first local style designation for applying a first selected local style to the first part of the target and a second local style designation for applying a second selected local style to a second part of the target, the first selected local style and the second selected local style being related to different styles that are different from colors.

12. The method according to claim 11, wherein the performing coloring processing reflecting the local style designation on the data of the target to be colored further includes:

inputting (ii) information indicating the second selected local style applied to the second part of the target, and (iii) information indicating a position of the second part to which the second selected local style is applied, into the neural network system for coloring the target to be colored.

13. The method according to claim 1, wherein the predetermined process is configured to extract different local style information from different input reference images and to output the different extracted local style information into the neural network system.

14. The method according to claim 1, wherein (i) the acquired data of the target to be colored and (ii) the extracted information indicating the selected local style applied to the first part of the target are input into the neural network system as separate data from each other, and the neural network system is configured to perform the coloring processing reflecting the local style designation on the first part of the target based on at least the input data of the target and the input extracted information.

15. The method according to claim 1, further comprising:
displaying the acquired data of the target to be colored and the reference image on respective display regions provided in a display screen, wherein the receiving the at least one local style designation includes:

designating, as the user-designated part, a part of the displayed reference image by a pointer; and designating, as the first part, a part of the displayed target by the pointer.

16. An automatic coloring device, comprising:
one or more memories; and
one or more processors configured to:
acquire data of a target to be colored;
receive at least one local style designation for applying a selected local style to at least a first part of the acquired data, wherein the selected local style is not applied to another part of the acquired data; and
perform coloring processing reflecting the local style designation on the data of the target to be colored, by inputting (i) the acquired data of the target to be colored, (ii) extracted information indicating the selected local style applied to the first part of the target, the extracted information being obtained from a predetermined process for extracting a local style based on a user-designated part of a reference image having the selected local style, and (iii) information indicating a position of the first part to which the selected local style is applied, into a neural network system for coloring the target to be colored, wherein the selected local style is related to a style different from a color, and wherein the neural network system is obtained based on at least a training process using at least (i) image data to be colored, (ii) extracted information that indicates a local style to be applied to a part of the image data to be colored and is obtained from the predetermined process for extracting a local style, (iii) information indicating a position of the part of the image data to be colored, and (iv) answer image data of the image data to be colored.

17. The automatic coloring device according to claim 16, wherein the one or more processors are configured to:
acquire the reference image;
receive at least one designation of a designated place in the acquired reference image;
extract, using the predetermined process for extracting the local style, the extracted information indicating the selected local style from the reference image with respect to at least the designated place; and
designate the first part to which the local style is applied with respect to the data.

18. The automatic coloring device according to claim 17, wherein a neural network system extracts the selected local style from the designated place in the reference image.

19. The automatic coloring device according to claim 16, wherein the at least one local style designation is a first local style of a plurality of local styles extracted in advance and stored by a storage device.

20. The automatic coloring device according to claim 16, further comprising:
an encoder obtained and updated by preparing plural sets of data and coloring correct answer image data and executing a plurality of steps for the plural sets of data and coloring correct answer image data, wherein the encoder is set to a neural network for extracting a local style, and each set includes data and coloring correct answer image data representing a correct answer coloring state for the data, and wherein the plurality of steps include:
a step of inputting the coloring correct answer image data as a reference image to the encoder extracting a local style and generating a local style map corresponding to each of all pixels of the input coloring correct answer image data;
a step of selecting at least one local style from the local style map extracted by the encoder and inputting the selected local style together with the data to a decoder;
a step of executing coloring processing reflecting the selected and input local style on the data in the decoder to obtain colored image data;
a step of calculating loss of the colored image data with respect to the coloring correct answer image data by a loss function, using the colored image data obtained by the decoder and the coloring correct answer image data; and
a step of updating parameters of the encoder and the decoder so as to reduce the loss calculated by the loss function.

21. The automatic coloring device according to claim 16, further comprising:
a decoder obtained and updated by preparing plural sets of data and coloring correct answer image data and executing a plurality of steps for the plural sets of data and coloring correct answer image data, wherein the decoder is set to a neural network for coloring, and each set includes data and coloring correct answer image data representing a correct answer coloring state for the data, and wherein the plurality of steps include:
a step of inputting the coloring correct answer image data as a reference image to an encoder extracting a local style and generating a local style map corresponding to each of all pixels of the input coloring correct answer image data;
a step of selecting at least one local style from the local style map extracted by the encoder and inputting the selected local style together with the data to the decoder;
a step of executing coloring processing reflecting the selected and input local style on the data in the decoder to obtain colored image data;
a step of calculating loss of the colored image data with respect to the coloring correct answer image data by a loss function, using the colored image data obtained by the decoder and the coloring correct answer image data; and
a step of updating parameters of the encoder and the decoder so as to reduce the loss calculated by the loss function.

22. The automatic coloring device according to claim 16, wherein the data of the target to be colored include line drawing data.

23. The automatic coloring device according to claim 16, wherein the predetermined process is configured to extract different local style information from different input reference images and to output the different extracted local style information into the neural network system.

24. The automatic coloring device according to claim 16, wherein the one or more processors are configured to:
display the acquired data of the target to be colored and the reference image on respective display regions provided in a display screen; and
receive an operation designating, as the user-designated part, a part of the displayed reference image by a pointer; and
perform the receiving of the at least one local style designation, by receiving at least pointer operations of designating, as the user-designated part, a part of the displayed reference image, and of designating, as the first part, a part of the displayed target.

25. A non-transitory computer readable medium storing a program that causes a computer to execute a method of automatic coloring, the method comprising:
acquiring a target image;
receiving a designation of (i) texture to be applied to a first part of the target image and (ii) a position of the first part of the target image, wherein the designation of texture is not applied to another part of the target image;
coloring at least the first part of the target image so that the texture designated is applied to the first part of the target image, by using a neural network system, wherein the neural network system is a neural network system into which the acquired target image, extracted information of the designated texture that is obtained from a predetermined process based on a user-designated part of a reference image having the texture, and information of the designated position of the first part of the target image are input,
wherein the neural network system is obtained based on at least a training process using at least (i) image data to be colored, (ii) extracted information of a texture to be applied to a part of the image data to be colored and is obtained from the predetermined process, (iii) information of a position of the part of the image data to be colored, and (iv) answer image data of the image data to be colored.

26. The non-transitory computer readable medium according to claim 25, wherein the coloring at least the first part of the target image includes:
outputting a colored version of the target image from the neural network system, the colored version of the target image having the first part to which the texture has been applied.

27. The non-transitory computer readable medium according to claim 25, wherein the coloring at least the first part of the target image colors another part of the target image, by using the neural network system.

28. The non-transitory computer readable medium according to claim 25, wherein receiving the designation of the position of the first part of the target image occurs after the receiving of the designation of the texture.

29. The non-transitory computer readable medium according to claim 25, wherein the neural network has been trained through (i) coloring a training image by inputting at least information of a texture and information of a position of a part of the training image into the neural network system, and (ii) updating parameters of the neural network system based on the colored training image and an answer image of the training image.

30. The non-transitory computer readable medium according to claim 25, wherein the predetermined process is configured to extract different information of different textures from different input reference images and to output the different extracted information into the neural network system.

31. The non-transitory computer readable medium according to claim 25, wherein the method further includes:
displaying the acquired target image and the reference image on respective display regions provided in a display screen,
wherein the receiving the designation of the texture and the position includes:
designating, as the user-designated part, a part of the displayed reference image by a pointer; and
designating, as the first part, a part of the displayed target image by the pointer.

32. A method of automatic coloring:
acquiring data of a target to be colored;
receiving a first local style designation for applying a first selected local style to a first part of the target to be colored and a second local style designation for applying a second selected local style to a second part of the target to be colored; and
performing coloring processing reflecting the first and second local style designations on the data of the target to be colored, by inputting (i) the acquired data of the target to be colored, (ii) extracted information indicating the first and second selected local styles applied to the first and second parts of the target respectively, the extracted information being outputted from a predetermined-process for extracting a local style based on a first user-designated part of a first reference image having the first selected local style and a second user-designated part of a second reference image having the second selected local style, and (iii) information indicating positions of the first and second parts to which the first and second selected local styles are applied respectively, into a neural network system for coloring the target to be colored,
wherein the first and second selected local styles are related, respectively, to first and second styles that are different from a color, and the first and second styles are different from each other, and
wherein the neural network system is obtained based on at least a training process using at least (i) image data to be colored, (ii) extracted information that indicates a local style to be applied to a part of the image data to be colored and is obtained from the predetermined process for extracting a local style, (iii) information indicating a position of the part of the image data to be colored, and (iv) answer image data of the image data to be colored.

33. A method of automatic coloring, comprising:
acquiring data of a target to be colored;
receiving at least one local style designation for applying a selected local style to at least a first part of the target to be colored, wherein the selected local style is not applied to another part of the target to be colored; and
performing coloring processing reflecting the local style designation on the first part of the target to be colored, by inputting (i) the acquired data of the target to be colored, (ii) extracted information indicating the selected local style applied to the first part of the target, the extracted information being extracted from a user-designated part of a reference image having the selected local style, and (iii) information indicating a position of the first part to which the selected local style is applied, into a neural network system for coloring the target to be colored,
wherein the selected local style is related to a style different from a color, and
wherein the neural network system is obtained based on at least a training process including:
generating colored image data by inputting (i) image data to be colored, (ii) extracted information that indicates a local style to be applied to a part of the image data to be colored and is outputted from the predetermined process for extracting a local style, (iii) information indicating a position of the part of the image data to be colored, into the neural network system; and
updating at least a part of the neural network system, based on at least the generated colored image data and answer image data of the image data to be colored.

34. A method of automatic coloring, comprising:
acquiring data of a target to be colored;
receiving at least one local style designation for applying a selected local style to at least a first part of the target to be colored, wherein the selected local style is not applied to another part of the target to be colored; and
performing coloring processing reflecting the local style designation on the first part of the target to be colored, by inputting (i) the acquired data of the target to be colored, (ii) extracted information indicating the selected local style applied to the first part of the target, the extracted information being extracted from a user-designated part of a reference image having the selected local style, and (iii) information indicating a position of the first part to which the selected local style is applied, into a neural network system for coloring the target to be colored,
wherein the selected local style is related to a style different from a color, and
wherein the neural network system is a decoder obtained based on
at least:
a step of executing coloring processing reflecting a local style on image data using the decoder to obtain colored image data, by inputting into the decoder (i) image data to be colored, (ii) extracted information that indicates the local style and is outputted from encoder a predetermined process for extracting a local style and (iii) information indicating a position of a part of the image data to which the local style is applied;

a step of calculating at least loss of the colored image data with respect to answer image data, using the colored image data obtained by the decoder and the answer image data; and a step of updating at least a part of parameters of the decoder based on at least the calculated loss.

35. An automatic coloring device, comprising:
one or more memories; and
one or more processors configured to:
acquire data of a target to be colored;
receive at least one local style designation for applying a selected local style to at least a first part of the acquired data, wherein the selected local style is not applied to another part of the acquired data; and
perform coloring processing reflecting the local style designation on the data of the target to be colored, by inputting (i) the acquired data of the target to be colored, (ii) extracted information indicating the selected local style applied to the first part of the target, the extracted information being obtained from a predetermined process for extracting a local style based on a user-designated part of a reference image having the selected local style, and (iii) information indicating a position of the first part to which the selected local style is applied, into a neural network system for coloring the target to be colored, wherein the selected local style is related to a style different from a color, and
wherein the neural network system is obtained based on at least a training process including:
generating colored image data by inputting (i) image data to be colored, (ii) extracted information that indicates a local style to be applied to a part of the image data to be colored and is obtained from the predetermined process for extracting a local style, (iii) information indicating a position of the part of the image data to be colored, into the neural network system; and
updating at least a part of the neural network system, based on at least the generated colored image data and answer image data of the image data to be colored.

36. A non-transitory computer readable medium storing a program that causes a computer to execute a method of automatic coloring, the method comprising:
acquiring a target image;
receiving a designation of (i) texture to be applied to a first part of the target image and (ii) a position of the first part of the target image, wherein the designation of texture is not applied to another part of the target image;
coloring at least the first part of the target image so that the texture designated is applied to the first part of the target image, by using a neural network system, wherein the neural network system is a neural network system into which the acquired target image, extracted information of the designated texture that is obtained from a predetermined process based on a user-designated part of a reference image having the texture, and information of the designated position of the first part of the target image are input,
wherein the neural network system is obtained based on at least a training process steps including:
generating colored image data by inputting (i) image data to be colored, (ii) extracted information of a texture to be applied to a part of the image data to be colored and is obtained from the predetermined process, (iii) information of a position of the part of the image data to be colored, into the neural network system; and
updating at least a part of the neural network system, based on at least the generated colored image data and answer image data of the image data to be colored.

* * * * *